United States Patent [19]

Uffelman

[11] Patent Number: 5,734,212
[45] Date of Patent: Mar. 31, 1998

[54] ELECTRIC FUEL PUMP RFI MODULE WITH PRE-MOLDED HOUSING

[75] Inventor: Bradley L. Uffelman, Caro, Mich.

[73] Assignee: Walbro Corporation, Cass City, Mich.

[21] Appl. No.: 747,541

[22] Filed: Nov. 12, 1996

[51] Int. Cl.⁶ .............................. H02K 5/24; H02K 11/00; H02K 5/12
[52] U.S. Cl. .............................. 310/51; 310/71; 310/68 R; 310/89; 310/87
[58] Field of Search .............................. 310/51, 71, 89, 310/91, 72, 68 R, 87

[56] References Cited

U.S. PATENT DOCUMENTS

| 3,719,843 | 3/1973 | Dochterman | 310/89 |
| 3,982,146 | 9/1976 | Hokky | 310/89 |
| 4,006,641 | 2/1977 | Alten | 73/398 AR |
| 4,342,070 | 7/1982 | Evans | 361/433 |
| 4,727,274 | 2/1988 | Adam et al. | 310/239 |
| 4,845,393 | 7/1989 | Burgess et al. | 310/51 |
| 4,959,504 | 9/1990 | Yarger et al. | 174/35 MS |
| 5,196,750 | 3/1993 | Strobl | 310/239 |
| 5,345,124 | 9/1994 | Lang | 310/51 |
| 5,357,161 | 10/1994 | Daniels | 310/89 |
| 5,519,271 | 5/1996 | Sakashita et al. | 310/71 |
| 5,656,878 | 8/1997 | Nakata | 310/71 |

Primary Examiner—Steven L. Stephan
Assistant Examiner—Michael J. Wallace, Jr.
Attorney, Agent, or Firm—Barnes, Kisselle, Raisch, Choate, Whittemore & Hulbert

[57] ABSTRACT

A preformed plastic housing encloses a pair of coils and a capacitor of a radio frequency interference (RFI) circuit for an electric motor of a fuel pump. The housing has a base and a cover which, when mated, provide a secure fit between the electrical circuit components and the housing. The preformed housing can accommodate different RFI circuits and is significantly less costly to manufacture than an overmolded RFI module. A grounding strap is connected to the input side of one coil and the capacitor adjacent an input terminal to the circuit to significantly lower the RFI levels in the circuit.

25 Claims, 2 Drawing Sheets

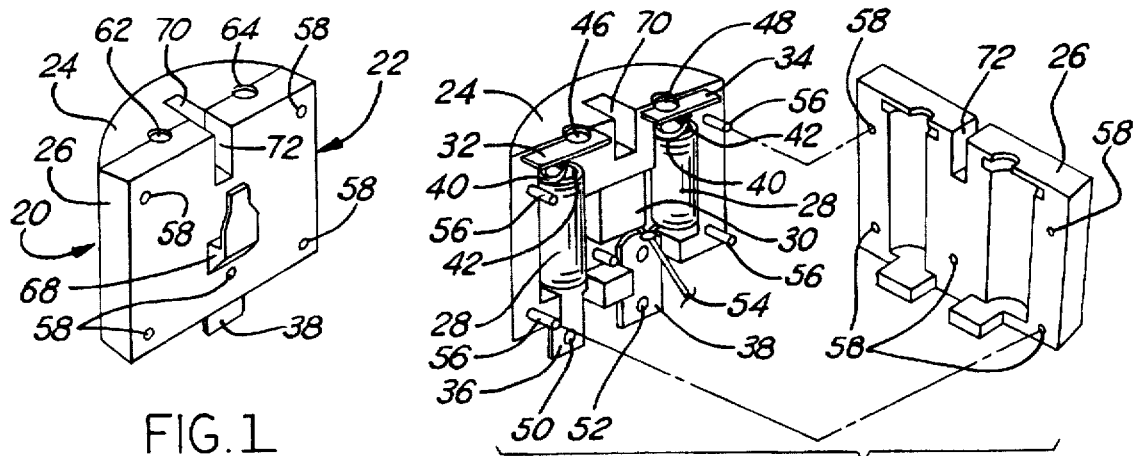
FIG. 1
FIG. 2
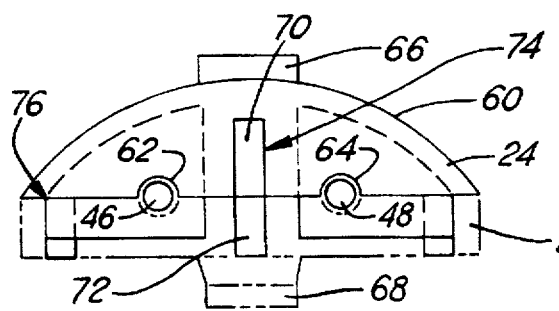
FIG. 3
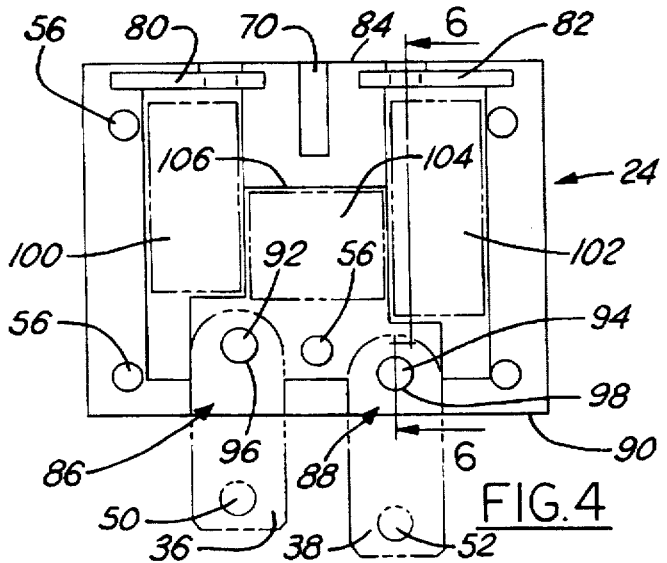
FIG. 4
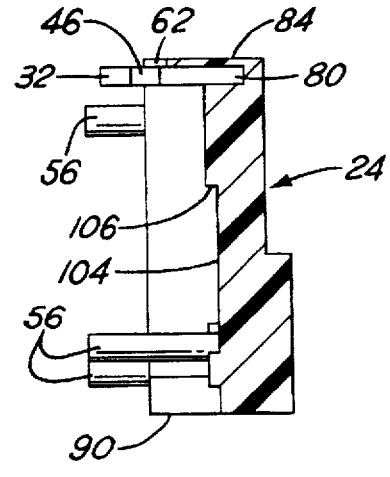
FIG. 6
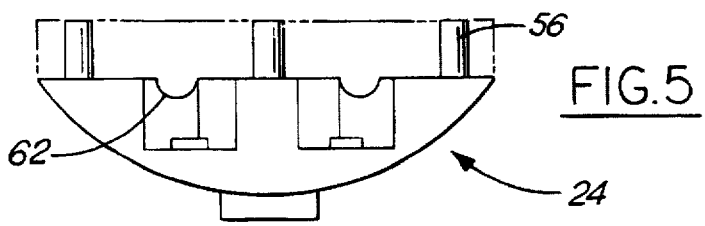
FIG. 5

5,734,212

ELECTRIC FUEL PUMP RFI MODULE WITH PRE-MOLDED HOUSING

FIELD OF THE INVENTION

This invention relates to radio frequency interference suppression and more particularly to a connector and circuit for an electric fuel pump radio frequency interference module.

BACKGROUND OF THE INVENTION

Electric motors within motor vehicles can operate at frequencies which interfere with the operation of radios or communication equipment within the vehicle. It is well-known to provide a simple electrical circuit connected to the motor to suppress those frequencies of electrical "noise" produced by the operating motor which interfere with the radio or communication equipment operation. These circuits, known as radio frequency interference (RFI) circuits, have been integrally molded or overmolded with a plastic housing. Overmolding the circuit with plastic requires different molds for different RFI circuits and also requires manual insertion of the circuit into the mold before the housing is formed. This process is labor intensive and time consuming and thus, overmolded radio frequency interference circuits are costly to manufacture.

Currently, to electrically ground the RFI circuit, a grounding strap is connected to the output side of the circuit. When connected in this manner, the RFI levels, while lowered due to the RFI circuit, remain relatively high.

SUMMARY OF THE INVENTION

A preformed plastic housing having a base and a cover which, when mated together, provides an enclosure receiving a radio frequency interference (RFI) circuit. Typically, a RFI circuit comprises a pair of coils and a capacitor connected across the coils. The coils and the capacitor are preferably attached to a pair of terminals and a pair of plates which provide input and output connectors to electrically connect the circuit to the brushes of an electric motor. To dramatically lower RFI levels, preferably a grounding strap is connected to an input terminal to the circuit. Also preferably, the electrical circuit is preassembled on a fixture which accurately locates the parts of the circuit so that they can be easily fitted into the premolded housing.

The premolded housing can be formed with an automated injection molding process which requires little or no manual labor. This greatly reduces the amount of time needed to make an assembly of the housing and circuit compared to a conventional overmolded RFI module and significantly lowers the cost to make an individual radio frequency interference module. Further, the premolded housing can accommodate different RFI circuitry enabling a single housing mold to be used in many different RFI circuit applications.

Objects, features and advantages of this invention include providing a radio frequency interference module for an electric fuel pump having a housing preformed of a plastic material that requires less manual labor to manufacture and assemble than conventional overmolded modules, can be formed by a substantially automated process which greatly reduces the time and cost to manufacture a module, provides a method to accurately locate the parts of the electrical circuit so that they can be readily fitted into the housing, can be used with different RFI circuitry, substantially reduces RFI levels, is substantially less expensive to manufacture than conventional radio frequency interference modules, provides a secure fit between the electrical components and the plastic housing to prevent movement or deformation of electrical components, is rugged, durable, of relatively simple design, and has a long useful life in service.

BRIEF DESCRIPTION OF THE DRAWINGS

These and other objects, features and advantages of this invention will be apparent from the following detailed description of the preferred embodiment and best mode, appended claims, and accompanying drawings in which:

FIG. 1 is a perspective view of a radio frequency interference module embodying this invention;

FIG. 2 is an exploded perspective view illustrating the cover of the housing removed from the base of the housing;

FIG. 3 is an end view of a radio frequency interference module embodying this invention;

FIG. 4 is a side view of the base of the housing;

FIG. 5 is an end view of the base of the housing;

FIG. 6 is a cross-sectional view of the base of the housing;

DETAILED DESCRIPTION OF THE PREFERRED EMBODIMENT

Figure 7:
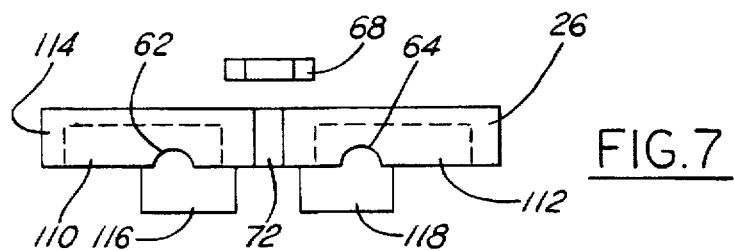
FIG. 7 is an end view of the cover of the housing.

FIG. 1 shows a radio frequency interference (RFI) module 20 which has an electrical circuit encased in a plastic housing having a base 24 and a cover 26 generally opposed and mated together. As shown in FIG. 2, the electrical circuit preferably comprises a pair of choke coils 28, a capacitor 30, a pair of electrically conductive output plates 32, 34 and a pair of electrically conductive power input terminals 36, 38. Typically, the coils 28 comprise a length of wire 40 tightly wrapped around a cylindrical iron core 42. One end of each coil 28 is connected to a separate plate 32, 34. The opposite end of each coil 28 is connected to an adjacent end of a separate terminal 36, 38. The capacitor 30 is preferably connected across the coils 28 adjacent to the input terminals 36, 38. An alternate RFI circuit comprises a capacitor connected across a pair of electric power input terminals. The choke coils are not present in this RFI circuit.

In the preferred embodiment, the electrically conductive plates 32, 34 are preferably made of a metal such as brass, and are formed with an arcuate bottom wall (see FIG. 3) complementary to the shape of the outer side wall of the base. Also preferably, each plate 32, 34 has an eyelet 46, 48 therethrough constructed to receive a pin of an electrical connector to provide an electrical output connection adjacent one end of the circuit. Similarly, the terminals 36, 38 are constructed to be received within an electrical connector of a peripheral device to provide an electrical power input connection adjacent the opposite end of the circuit. Preferably, the terminals 36, 38 are elongate, thin walled, generally rectangular, made of metal such as brass and extend longitudinally exteriorly of the housing 22. Also preferably, each terminal 36, 38 is formed with an opening 50, 52 exterior of the housing constructed to receive a complementary shaped pin of the female electrical connector of the peripheral device. This provides an interlocking fit to retain the electrical connection between the RFI module 20 and the female electrical connector.

To electrically ground the RFI circuit and to decrease RFI levels, a grounding strap 54 is connected between the circuit and a grounding surface (not shown). Preferably, the strap 54 is metallic and more preferably, the strap is formed of brass. According to the present invention, to achieve dramatically reduced RFI levels, the grounding strap 54 is connected to the input side of the circuit and preferably, to one of the terminals 36, 38 which is the common or "ground" side of circuit.

As shown in FIG. 2, the housing 22 comprises two separate sections, a base 24 and a cover 26. Both the base 24 and the cover 26 are preformed of a plastic material and are constructed to be mated together in generally opposed face to face relationship. To locate the base 24 and cover 26 in opposed relation to each other, preferably a plurality of pins 56 are formed on the base 24 and are constructed to be received in a plurality of complementary openings 58 in the cover 26. Optionally, the base 24 and cover 26 can be integrally molded with a living hinge to facilitate mating them together. After the base 24 and cover 26 are mated together (with the RFI circuit therein), the housing 22 can be ultrasonically welded or heat sealed to permanently connect the base 24 and cover 26. Alternatively, the distal ends of the pins can be heat staked or ultrasoncially welded to the outer face of the cover 26.

As shown in FIG. 3, preferably, to provide a RFI module 20 with a shape complementary to the shape of a fuel pump, the outer side wall 60 of the base 24 is generally arcuate. To allow connector pins to be inserted into the plates of the electrical circuit the housing 22 is formed with a pair of openings 62, 64 therethrough which communicate with the eyelets 46, 48 of the plates and are constructed to receive a pin of an electrical connector therein.

To facilitate locating an electrical connector adjacent the module 20 and the plates 32, 34, preferably, the base 24 is formed with a cavity 70 located between the plates 32, 34. Also preferably, the cover 26 of the housing 22 has a corresponding recess 72 which aligns with the cavity 70 of the base 24 when the cover 26 and base 24 are mated. This creates a slot 74 in the RFI module housing 22 which receives a complementary shaped projection of an electrical connector to locate the electrical connector adjacent the RFI module 20 and thereby facilitate insertion of the pins of the connector into the eyelets 46, 48 of the plates 32, 34. To also aid in locating and retaining an electrical connector adjacent the plates 32, 34, the cover 26 preferably has a retainer clip 68 extending therefrom constructed to be received adjacent an electrical connector. Similarly, to facilitate locating a connector adjacent the housing 22 and the input terminals 36, 38, the bottom wall 60 of the base 24 has a step 66 adjacent the terminals 36, 38 which extends longitudinally along the bottom wall 60 of the base 24 and is constructed to be received in a complementary recess of the electrical connector.

As shown in FIG. 4, the base 24 of the housing 22 is formed with a pair of slots 80, 82 adjacent its back edge 84 which are constructed with an arcuate bottom to slidably receive the plates 32, 34 therein. A pair of recesses 86, 88 are formed in the front wall 90 of the base 24 and each is constructed to receive one of the terminals 36, 38. Preferably, to locate the terminals 36, 38 and provide resistance to movement of the terminals 36, 38, a pair of pins 92, 94 are provided on the base 24 of the housing 22, one adjacent each recess 86, 88, and the terminals 36, 38 are formed with a complementary hole 96, 98 therethrough each constructed to receive a pin 92, 94.

To receive the coils 28 between the plates 32, 34 and the terminals 36, 38, preferably the base 24 is formed with a pair of elongate, concave or semi-cylindrical pockets 100, 102 that extend longitudinally from adjacent the slots 80, 82 near the back edge 84 of the base 24 to adjacent the terminals 36, 38 towards the front end wall 90 of the base 24. Also preferably, to receive the capacitor 30 between the two pockets 100, 102 which contain the coils 28, a rectangular recess 104 is formed in the base 24 between the pockets 100, 102 and is constructed to receive the capacitor 30. This recess 104 also provides an abutment 106 adjacent the capacitor 30 which substantially prevents movement of the capacitor in the direction of the abutment 106. With the capacitor 30 connected adjacent the terminals 36, 38, this also helps to inhibit movement of the terminals 36, 38 in the direction of the coils 28 or capacitor 30.

As shown in FIG. 5, the openings 62, 64 in the housing 22 adjacent the eyelets 46, 48 of the plates 32, 34 are partially formed in the side wall 76 of the base 24. The plates 32, 34 are constructed to be received adjacent these openings 62, 64 such that the eyelets 46, 48 of the plates 32, 34 and the openings 62, 64 in the housing 22 are substantially coaxial. The pins 56 of the base 24 which are constructed to be received in the openings 58 of the cover 26 extend generally perpendicular to the side wall 76 of the base 24.

As shown in FIGS. 4 and 6, each plate 32, 34 is partially received in a slot 80, 82 of the base 24 so that the eyelets 46, 48 of the plates are in communication with the openings 62, 64 partially formed in the base 24. FIG. 6 also shows the location of the pins 56 relative to the back 84 and front end walls 90 of the base 24.

Figure 8:
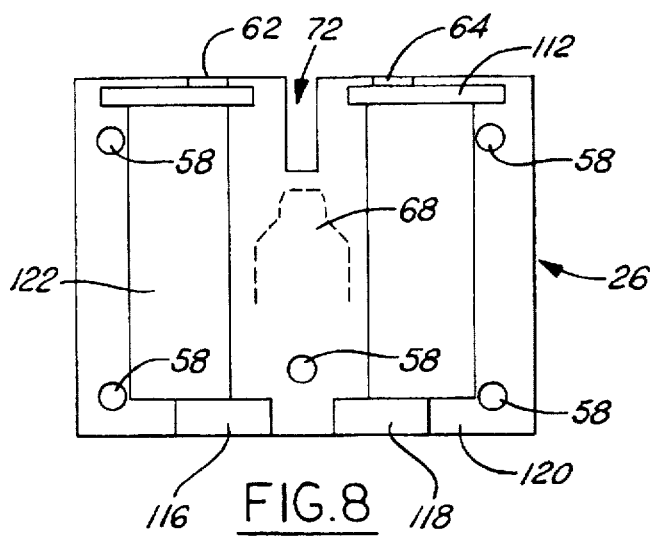
FIG. 8 is a side view of the interior of the cover of the housing.

As shown in FIGS. 7 and 8 to partially receive the plates 32, 34 in the cover 26 a pair of slots 110, 112 are formed adjacent the end wall 114 of the cover 26. Preferably, the openings 62, 64 which communicate with the eyelets 46, 48 of the plates 32, 34 are partially formed adjacent the back wall 114 of the cover 26 so that when the cover 26 and base 24 are mated, a pair of generally circular openings 62, 64 are provided in the back wall 114 of the housing 22 to allow insertion of a pin of an electrical connector into the eyelet 46, 48 of each plate 32, 34. To firmly overlie and prevent upward movement of the terminals 36, 38, a pair of tangs 116, 118, extending generally transverse to the plane of the cover 26, are formed adjacent the front wall 120 of the cover 26 and are constructed to be received in the recesses 86, 88 of the base 24 adjacent the terminals 36, 38.

Figure 9:
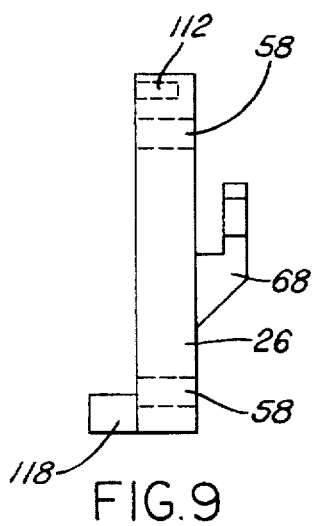
FIG. 9 is an edge view of the cover of the housing.

As shown in FIG. 8, to partially receive and retain the coils 28, a pair of elongate, concave and preferably semi-cylindrical pockets 122, 124 extend from adjacent the slots 110, 112 near the back wall 114 of the cover 26 to adjacent the tangs 116, 118 near the front wall 120 of the cover 26. These pockets 122, 124 are aligned with the pockets 100, 102 in the base 24 such that when the confronting base 24 and cover 26 are mated together the pockets 100, 102 and 122, 124 form a pair of generally cylindrical enclosures each constructed to receive one coil 28. An edge view of the cover 26 is shown in FIG. 9 and illustrates the location of the slots 110, 112, openings 58, tangs 116, 118 and retainer clip 68.

Figure 10:
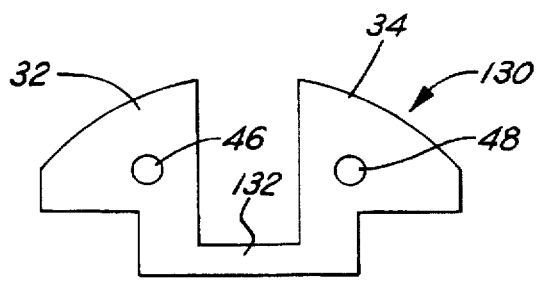
FIG. 10 is a side view of a stamping which forms a pair of electrically conductive plates.
Figure 11:
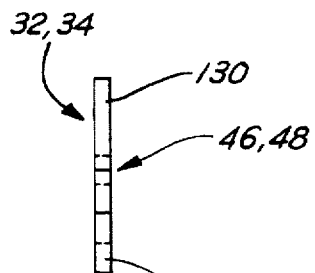
FIG. 11 is an edge view of the stamping of FIG. 10.

As shown in FIG. 10, the electrically conductive plates 32, 34 of the RFI circuit may be formed together in a single stamping 130 to facilitate forming the plates 32, 34 and locating the eyelets 46, 48 due to the relatively small size of the plates 32, 34. After the stamping 130 has been formed, and the eyelets 46, 48 have been provided in each plate 32, 34 of the stamping 130, the arm 132 which connects the electrically conductive plates 32, 34 is sheared off providing two separate plates 32, 34. As shown in FIG. 11, the plates 32, 34 are relatively thin walled with the eyelets 46, 48 extending completely therethrough.

Figure 12:
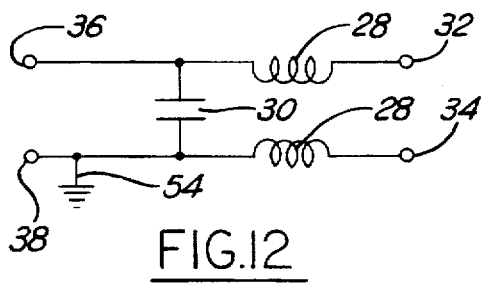
FIG. 12 is a schematic view of a RFI electrical circuit.

As shown in the schematic of FIG. 12, the capacitor 30 is connected across the coils 28 with each coil 28 connected at one end to an output plate 32, 34 and at the other end to a power input terminal 36, 38. Further, to significantly reduce RFI levels, the grounding strap 54 is connected to the capacitor and one coil adjacent to an input terminal 38.

Figure 13:
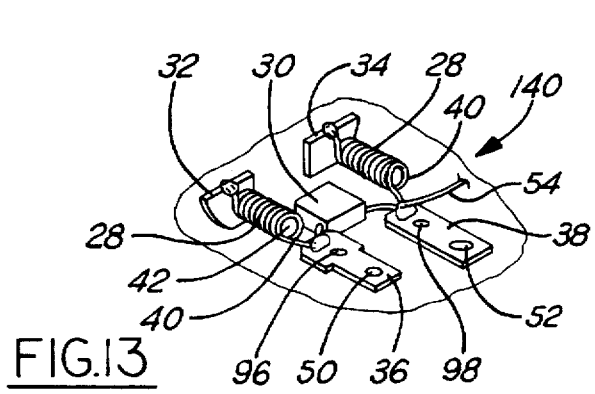
FIG. 13 is a perspective view illustrating the electrical components of the RFI circuit received on a fixture used to accurately locate the circuit components.

As shown in FIG. 13, a fixture 140 may be used to accurately locate and connect the components of the RFI circuit. Preferably, the fixture has a pair of slots to receive the plates 32, 34, a pair of recesses to receive the coils 28 and either a pair of cavities to receive the terminals 36, 38 or a pair of pegs to be received in the openings 50, 52 of the terminals 36, 38 In use, the coils 28, capacitor 30, plates 32, 34 and terminals 36, 38 are disposed on the fixture 140 to accurately locate the parts relative to each other and to the base 24 and cover 26. The components are soldered together or otherwise connected to form the electrical circuit as a separate sub-assembly. The electrical circuit is then removed from the fixture 140 to be placed into the base 24 of the housing 22.

The base 24 and cover 26 are preformed of a plastic material preferably by a substantially automated injection molding process or the like. The electric component sub-assembly is aligned with the base 24 of the housing 22 and then press-fit into the base 24 so that the electrical components are received in the housing 22 as described. The cover 26 is then fitted onto the base 24 with the pins 56 of the base 24 received in the openings 58 of the cover 26. To permanently connect the cover 26 and base 24, they are ultrasonically welded or otherwise heat sealed together.

Preferably, the pins of an electrical connector are then press-fit into the eyelets 46, 48 of the plates 32, 34 and the terminals 36, 38 are inserted into another electrical connector to provide input and output connections with the RFI circuit. To electrically ground the circuit the free-end of the grounding strap 54 is connected to the grounding surface. When properly connected to an electric fuel pump, the RFI circuit functions to suppress the frequencies of the signal produced by the electric fuel pump that interfere with the operation of radio or communication equipment within the vehicle.

I claim:

1. A fuel pump electric motor radio frequency interference module comprising a pair of coils, a capacitor connected across the coils, a pair of electrically conductive plates each connected to one end of one coil, a pair of electrically conductive terminals each connected to the other end of one of the coils, a housing having a base and a cover generally opposed, mated together and each preformed of a plastic material, a pair of slots at least partially formed in both the base and cover with each slot constructed to receive one of the plates adjacent one end of the housing, a pair of recesses formed in the housing each constructed to receive one of the terminals adjacent a generally opposed end of the housing, and a pair of pockets at least partially formed in both the base and cover between the slots and recesses with each pocket connected to receive one coil and the base and cover being constructed and arranged with a parting plane generally parallel to the axes of the pockets for the coils and passing through the pockets.

2. The module of claim 1 wherein the base and cover are formed with a plurality of pins and complementary openings in which said pins are received to locate the portions of the housing together.

3. The module of claim 1 wherein said base and cover are heat sealed together.

4. The module of claim 1 wherein said base and cover are integrally molded with a living hinge.

5. The module of claim 1 wherein said plates have openings therethrough constructed to receive an electrical connector.

6. The module of claim 1 wherein the housing has a retainer clip thereon constructed to receive and retain an electrical connector adjacent the housing.

7. The module of claim 1 wherein the housing has a pin adjacent each terminal and each terminal has an opening therein constructed to slidably receive said pin to locate and retain the terminals.

8. The module of claim 1 wherein said housing has a recess formed between said pockets constructed to receive said capacitor.

9. The module of claim 1 wherein said pockets extend generally parallel to each other.

10. The module of claim 1 wherein said terminals are elongate and extend generally parallel to each other and to the axes of the coils.

11. The module of claim 10 wherein said terminals extend exteriorly of said housing.

12. The module of claim 1 wherein said coils are tightly wound and firmly attached to said terminals providing resistance to the terminals being moved towards the coils.

13. The module of claim 1 wherein the capacitor is connected across the terminals.

14. The module of claim 13 comprising an abutment closely adjacent the capacitor which provides resistance to capacitor movement and thereby provides resistance to the terminals being moved towards the coils.

15. The module of claim 1 wherein the module also comprises a grounding strap connected adjacent one of the terminals.

16. The module of claim 15 wherein the grounding strap is metallic.

17. The module of claim 16 wherein the strap is made of brass.

18. The module of claim 1 wherein the module also comprises a grounding strap connected with one end of one coil and one lead of the capacitor and said one end of said coil and one lead of the capacitor are on the power input side of the radio interference circuit.

19. The module of claim 1 wherein the grounding strap is constructed to be electrically connected to a metal shell encircling an electric motor of the fuel pump.

20. The module of claim 1 wherein each of the coils, and the capacitor are encapsulated within the housing to prevent exposure to liquid fuel.

21. An electric fuel pump radio frequency interference module comprising, a pair of electrically conductive plates, a pair of electrically conductive terminals attached adjacent said plates, a capacitor connected across the terminals, a housing having two generally opposed and mating sections each preformed of a plastic material, a pair of slots in both sections of the housing constructed to receive said plates, a pair of recesses in at least one section of the housing constructed to receive said terminals and a pocket formed in the housing constructed to receive the capacitor between the terminals and the base and the cover being constructed and arranged with a parting plane generally parallel to the terminals and passing through the pocket to receive the capacitor.

22. A method of making a fuel pump electric motor radio frequency interference module having a pair of coils and a capacitor connected across the coils comprising the steps of:
  a) providing a pair of electrically conductive plates;
  b) providing a pair of electrically conductive terminals;
  c) providing a fixture constructed to carry the coils, each plate adjacent one end of one of the coils, each terminal adjacent the other end of one of the coils and the capacitor between the coils;
  d) disposing the coils, plates, terminals and capacitor on the fixture;
  e) connecting the terminals and the plates to the coils and connecting the capacitor across the coils and adjacent each terminal thereby providing an electrical circuit;
  f) providing a housing having a base and cover generally opposed, mateable together and each preformed of a plastic material and constructed to receive the electrical circuit between the base and cover when mated;
  g) disposing the electrical circuit in one portion of the housing; and
  h) mating the base and cover to enclose the electrical circuit.

23. The method of claim 22 wherein the electrical circuit also comprises a grounding strap connected to one end of one of the coils and one lead of the capacitor adjacent one of the terminals and wherein power for energizing the electric motor is input through the terminals.

24. A fuel pump electric motor radio frequency interference module comprising at least one coil, at least one capacitor connected to a coil, a pair of electrically conductive terminals with a coil connected to a terminal, a pair of electrically conductive plates with a coil connected to a plate, a housing having a base and a cover generally opposed, mated together and each preformed of a plastic material, a pair of slots at least partially formed in both the base and the cover with each constructed to receive a plate adjacent one end of the housing, a pair of pockets at least partially formed in both the base and the cover with each constructed to receive one coil, and a pair of recesses formed in the housing each constructed to receive one of the terminals and the base and cover being constructed and arranged with a parting plane generally parallel to the axes of the pockets for the coils and passing through the pockets.

25. A fuel pump electric motor radio frequency interference module comprising at least one coil, at least one capacitor connected to a coil, a pair of electrically conductive terminals with a coil connected to a terminal, a housing having a base and a cover generally opposed, mated together and each preformed of a plastic material, a pair of pockets at least partially formed in both the base and the cover with each constructed to receive one coil, a pair of recesses formed in the housing each constructed to receive one of the terminals and the base and cover being constructed and arranged with a parting plane generally parallel to the axes of the pockets for the coils and passing through the pockets.

* * * * *